United States Patent [19]
Kondo et al.

[11] Patent Number: 6,085,729
[45] Date of Patent: Jul. 11, 2000

[54] FUEL INJECTION CONTROL FOR ENGINES RESPONSIVE TO FUEL INJECTION TIMING

[75] Inventors: Wakichi Kondo, Kariya; Daiji Isobe, Toyohashi, both of Japan

[73] Assignee: Denso Corporation, Kariya, Aichi-pref., Japan

[21] Appl. No.: 09/167,544

[22] Filed: Oct. 7, 1998

[30] Foreign Application Priority Data

Dec. 10, 1997 [JP] Japan .................................... 9-339707

[51] Int. Cl.[7] .................................................. F02M 51/00
[52] U.S. Cl. .......................................... 123/478; 123/490
[58] Field of Search ..................... 123/478, 490

[56] References Cited

U.S. PATENT DOCUMENTS

| | | |
|---|---|---|
| 4,785,786 | 11/1988 | Nagao et al. . |
| 5,117,795 | 6/1992 | Ohsuga et al. . |
| 5,402,760 | 4/1995 | Takeuchi et al. .................. 123/490 |
| 5,755,208 | 5/1998 | Bombarda et al. ................. 123/478 |
| 5,758,308 | 5/1998 | Maki et al. ........................ 123/478 |
| 5,832,901 | 11/1998 | Yoshida et al. .................... 123/478 |
| 5,865,158 | 2/1999 | Cleveland et al. ................. 123/478 |

FOREIGN PATENT DOCUMENTS

| | | |
|---|---|---|
| 60-11652 | 1/1985 | Japan . |
| 60-98145 | 6/1985 | Japan . |
| 60-184921 | 9/1985 | Japan . |
| 62-82241 | 4/1987 | Japan . |
| 64-11367 | 1/1989 | Japan . |
| 1-208540 | 8/1989 | Japan . |
| 1-134741 | 9/1989 | Japan . |
| 2-188646 | 7/1990 | Japan . |
| 4-86351 | 3/1992 | Japan . |
| 4-303141 | 10/1992 | Japan . |

OTHER PUBLICATIONS

U.S. application No. 09/071,498, Nozawa et al., filed May 4, 1998.

*Primary Examiner*—John Kwon
*Attorney, Agent, or Firm*—Nixon & Vanderhye P.C.

[57] ABSTRACT

In a fuel injection control for engines, a basic transient correction coefficient is calculated to be used for correcting a basic fuel injection amount calculated based on intake air pressure. This transient correction coefficient is itself corrected by a further correction coefficient which corresponds to a fuel injection timing variable so as to overlap with the opening of an intake valve. The basic fuel injection amount is then corrected by the corrected transient correction coefficient to determine a final fuel injection amount. Thus, air-fuel mixture is controlled to a desired air-fuel ratio even when the engine is in a transient condition, thereby improving drivability and exhaust emissions.

9 Claims, 6 Drawing Sheets

FUEL INJECTION CONTROL FOR ENGINES RESPONSIVE TO FUEL INJECTION TIMING

CROSS REFERENCE TO RELATED APPLICATION

This application relates to and incorporates herein by reference Japanese Patent Application No. 9-339707 filed on Dec. 10, 1997.

BACKGROUND OF THE INVENTION

1. Field of the Invention

The present invention relates to a fuel injection control system and method for internal combustion engines, which compensates the fuel injection amount in response to changes in fuel injection timing dependent on operating condition of an internal combustion engine to improve vehicle drivability.

2. Description of Related Art

It is a general practice in a conventional fuel injection control for internal combustion engines to terminate fuel injection of a fuel injector at a fixed crankshaft angular position, so that all the required amount of fuel may be injected within the exhaust stroke of an engine which precedes the suction stroke. That is, the fuel injector is driven to start fuel injection before the intake valve opens. As a result, fuel injected from the fuel injector sticks or stays on the inside wall of an intake passage provided upstream of the intake valve, and then vaporizes and enters into the combustion chamber of the engine together with the intake air in the suction stroke of the engine.

It is a recent trend to control fuel injection timing variably in response to changes in the operating condition of the engine for improving vehicle drivability. In this system, the intake air flow speed, intake port temperature, intake valve temperature, fuel spray diffusion and the like changes in response to changes in fuel injection timing. Thus, the amount of fuel sticking or staying (fuel wetting) on the intake port changes responsively. This fuel wetting is likely to cause deviations of the actual air-fuel ratio of mixture supplied to the engine from a desired air-fuel ratio, particularly when the engine changes its operating condition.

SUMMARY OF THE INVENTION

It is an object of the present invention to obviate the above drawbacks.

It is another object of the present invention to compensate the fuel injection amount appropriately even in an engine transient condition, in which the amount of injected fuel wetting the intake port and the like varies due to changes in fuel injection timing.

According to the present invention, fuel injection timing is changed variably so that a fuel injector injects fuel during the open period of an intake valve, and the fuel injection amount is corrected by a transient correction coefficient variable with fuel injection timing.

Preferably, the transient correction coefficient is varied in accordance with crankshaft rotation angular position which corresponds to fuel injection timing. Alternatively, the transient correction coefficient is varied in accordance with intake valve opening timing corresponding to fuel injection timing.

More preferably, the transient correction coefficient is increased as fuel injection timing deviates from an optimum injection timing.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
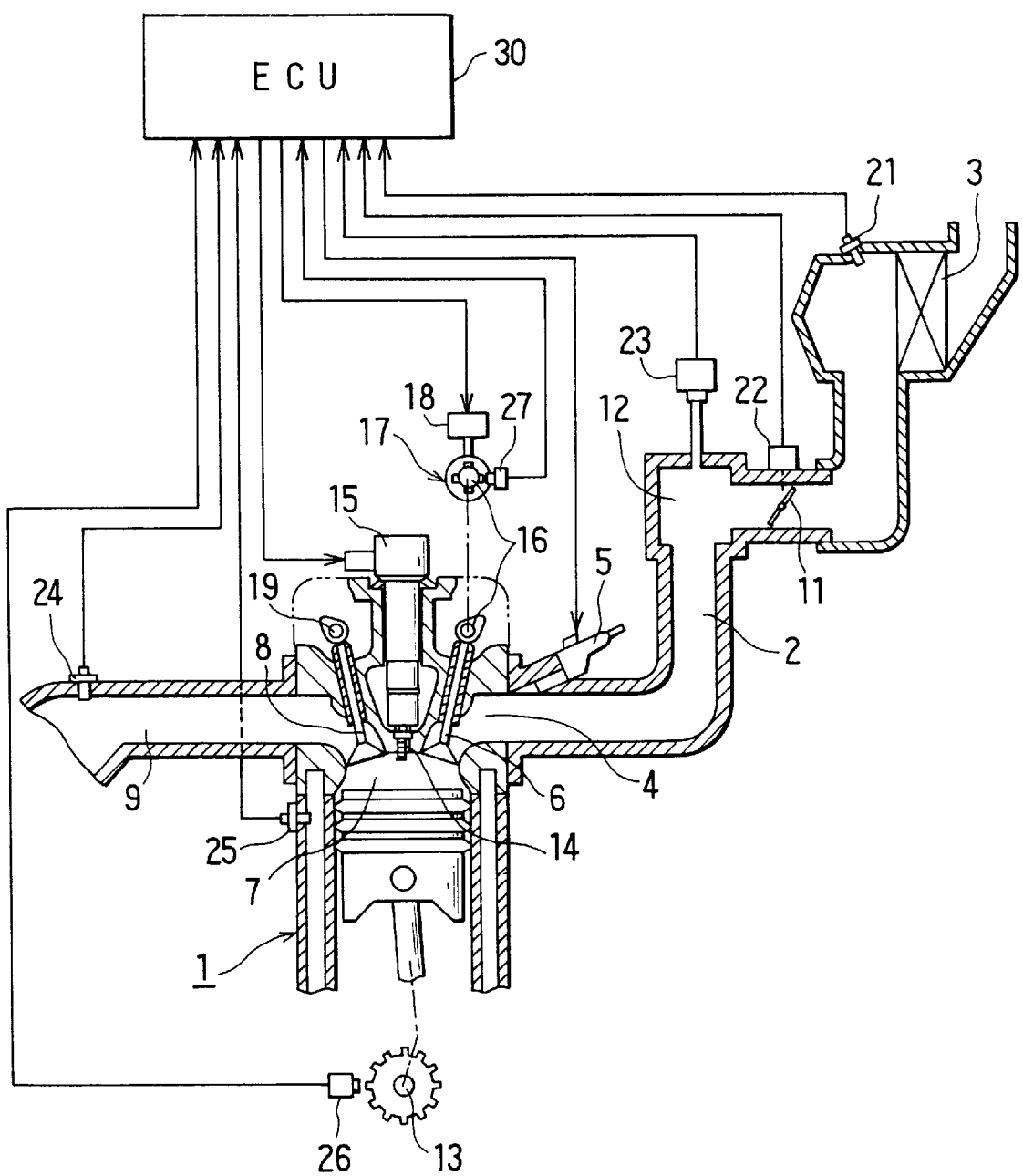
FIG. 1 is a schematic view of a fuel injection timing control system for engines according to an embodiment of the present invention.

Referring first to FIG. 1, an internal combustion engine 1 is a dual over head cam (DOHC) type and has an intake passage 2 and an air cleaner 3 to take in air therethrough. A throttle valve 11 linked with an accelerator pedal (not shown) is disposed in the intake passage 2 at a position upstream of a surge tank 12 of the intake passage 2 to vary the amount of intake air supplied to the combustion chamber 7. Fuel injectors 5 are mounted on the engine 1 to inject fuel into intake ports 4, respectively. The mixture of the intake air and injected fuel is sucked into combustion chambers 7 through intake valves 6 in the suction stroke of each cylinder. The combustion-resultant exhaust gas is discharged through exhaust valves 8 and an exhaust passage 9.

Spark plugs 14 and igniter/coil units 15 are mounted on the engine 1 to ignite the mixture in the combustion chambers 7 sequentially to drive the crankshaft 13.

The engine 1 has a camshaft 16 for the intake valves 6, which is driven by a hydraulically-operated variable valve timing control mechanism (VVT) 17. This VVT 17 is in turn driven by an oil pressure control valve (OCV) 18, so that the camshaft rotation position may be controlled to have a variable target phase difference in rotation position relative to that of the crankshaft 13. A camshaft 19 for the exhaust valves 8 has no VVT mechanism.

On the intake passage 2, an intake air temperature sensor 21 is provided near the air cleaner 3 to detect intake air temperature THA, a throttle angle sensor 21 is provided near the throttle valve 11 to detect throttle opening angle TA, and an intake air pressure sensor 23 is provided in communication with the surge tank 12 to detect intake air pressure PM. An air-fuel ratio sensor 24 is provided on the exhaust passage 9 to detect oxygen concentration in the exhaust gas. On the engine 1, a coolant temperature sensor 25 is provided to detect coolant temperature THW, and a crank angle sensor 26 is provided to detect angular position of a crankshaft 13. A cam angle sensor 27 is provided on the VVT 17 to detect angular position of the camshaft 16.

An electronic control unit (ECU) 30 includes, although not shown, a CPU, ROM storing control programs, RAM storing temporarily various calculation data, back-up RAM, and input/output circuit as known well in the art. The ECU 30 is connected to the above sensors 21 to 27 to calculate control values for the injectors 5, spark plugs 14, and igniter/coil units 15 from detection outputs of the sensors 21 to 27. That is, the ECU 30 controls the fuel injection timing and fuel injection amount of the fuel injectors 5, ignition timing of the spark plugs 14 and the valve opening timing of the intake valves 6 optimally to match the detected engine operating condition.

Figure 2:
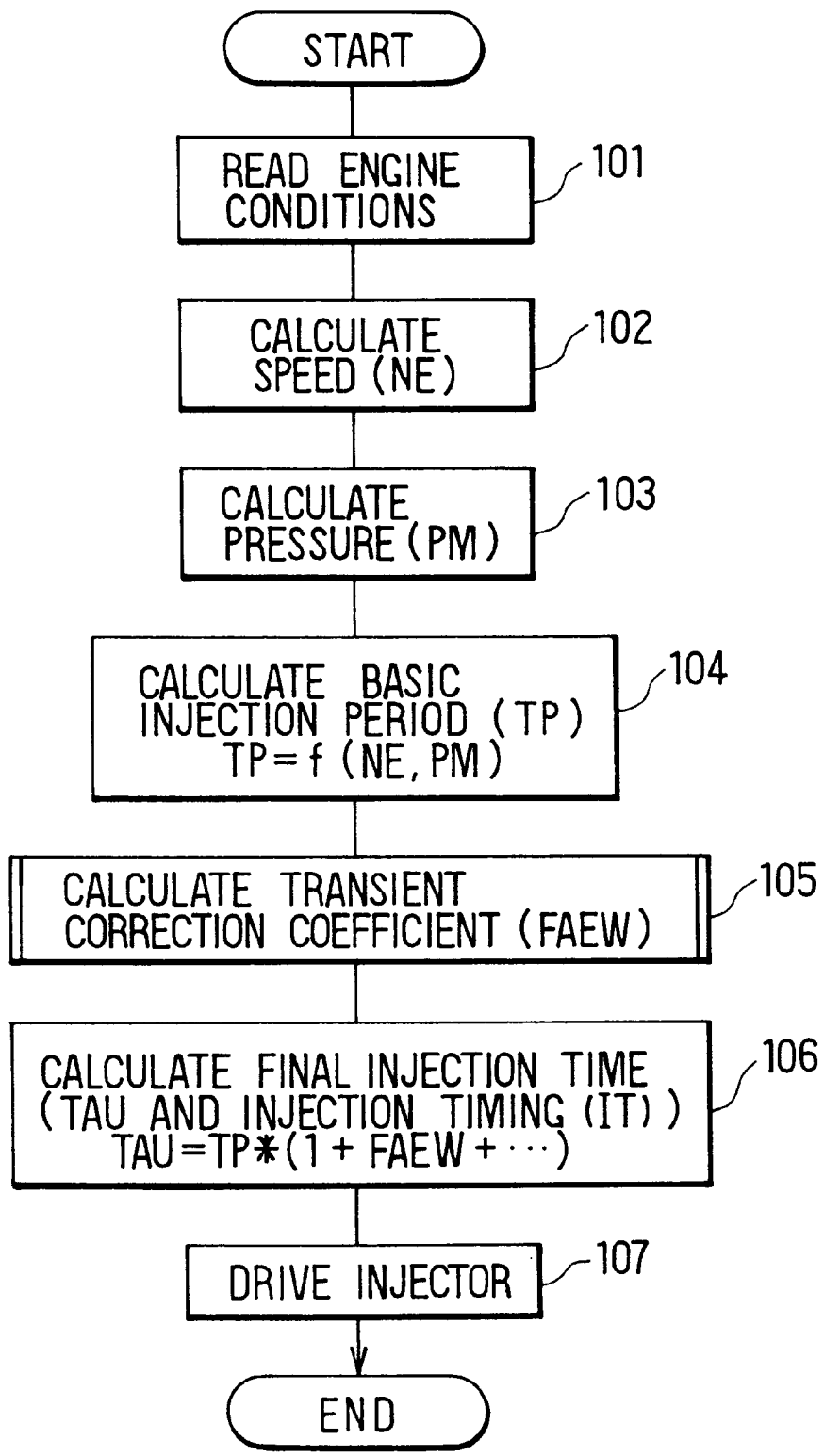
FIG. 2 is a flowchart showing a main control routine executed by a computer used in the embodiment of FIG. 1.
Figure 3:
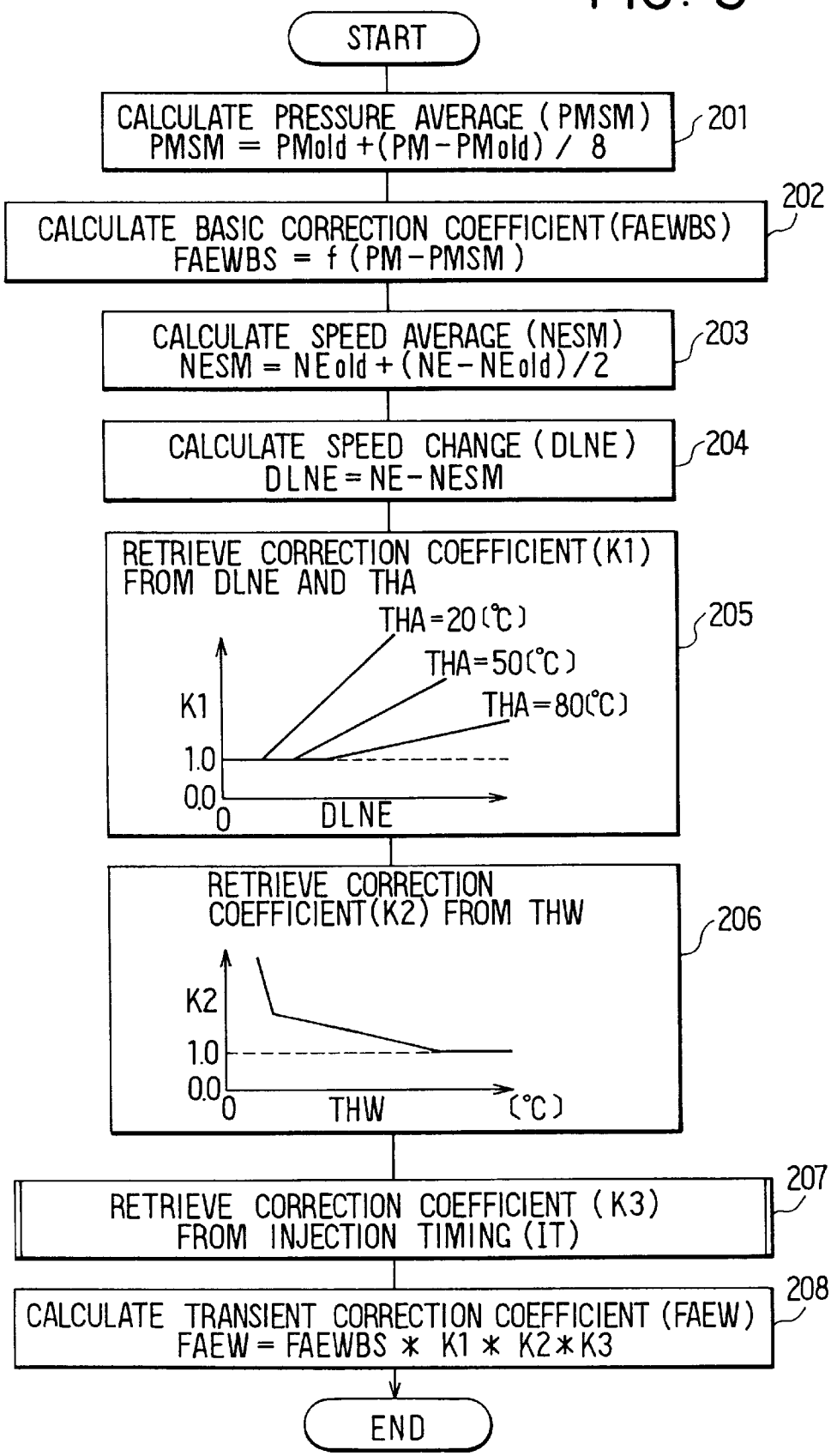
FIG. 3 is a flow chart showing a sub-routine for calculating a transient correction coefficient executed in the main control routine shown in FIG. 2.

Specifically, the CPU of ECU 30 is programmed to execute the control programs shown in FIGS. 2 and 3 with respect to the fuel injection control.

The CPU calculates the fuel injection amount based on the main routine (FIG. 2) at every 180degrees crankshaft rotation (° CA) in response to the crankshaft angular position signal from the crank angle sensor 26.

Specifically, the CPU reads in various detection outputs of the sensors 21 to 27 indicative of the engine operating condition in step 101. The CPU calculates the engine rotation speed NE from the output of the crank angle sensor 26 in step 102 and calculates the intake air pressure PM from the pressure sensor 23 in step 102. The CPU then calculates in step 104 a basic fuel injection amount as a time (duration) TP as a function of NE and PM: TP=f (NE, PM).

The CPU then calculates a transient correction coefficient FAEW in step 105 which is shown in detail in FIG. 3, and calculates in step 106 a final fuel injection amount as a final fuel injection period TAU as a function of TP, FAEW and other correction coefficients calculated in other routines based on the coolant temperature: TAU=TP·(1+FAEW+ . . . ). The CPU further calculates in step 106 a fuel injection timing IT. The injection timing IT is so calculated that the fuel may be injected during the opening period of the intake valve 6 in consideration of the intake valve opening timing. The fuel injection timing IT means a crankshaft rotation position or angle (° CA) at which injecting fuel from the fuel injector 5 is terminated, in case of variably controlling the end of fuel injection. In this instance, a crankshaft rotation position (° CA) at which injection fuel from the fuel injector 5 is started may be calculated from the injection timing IT and the rotation speed NE.

The CPU, determining the particular one of the fuel injectors 5 to be driven in response to the output of the crank angle sensor 26, and produces a pulse signal having the final fuel injection period TAU in step 107 to drive the fuel injector 5 to open for fuel injection.

The transient correction coefficient FAEW (step 105) is calculated as shown in FIG. 3 at every 180° CA. That is, the CPU calculates an average or smoothed intake air pressure PMSM in step 201 as a function of the pressure PMold calculated in the previous processing cycle and the pressure PM calculated in the current processing cycle: PMSM= PMold+(PM−PMold)/8.

The CPU then calculates in step 202 a basic transient correction coefficient FAEWBS as a function of the difference between the averaged and currently calculated intake air pressures PMSM and PM: FAEWBS=f (PM−PMSM).

The CPU calculates in step 203 an average or smoothed rotation speed NESM from the rotation speed Neold calculated in the previous processing cycle and the rotation speed NE calculated in the current processing cycle: NESM= NEold+(NE−NEold)/2.

The CPU further calculates in step 204 a rotation speed change DLNE between the current rotation speed NE and the averaged rotation speed NESM: DLNE=NE−NESM.

The CPU then determines in step 205 a correction coefficient K1 as a function of the rotation speed change DLNE and the intake air temperature THA calculated from the output of the intake air temperature sensor 21. This coefficient K1 may be retrieved from a mapped data stored in the ROM and defining a relation among K1, DLNE and THA. The correction coefficient K1 is defined to increase, as the rotation speed change DLNE increases and the intake air temperature THA decreases.

The CPU further determines in step 206 a correction coefficient K2 as a function of the coolant temperature THW calculated from the output of the coolant temperature sensor 25. This coefficient K2 may be retrieved from a mapped data stored in the ROM and defining a relation between K2 and THW. The correction coefficient K1 is defined to increase, as the coolant temperature increases.

Figure 4:
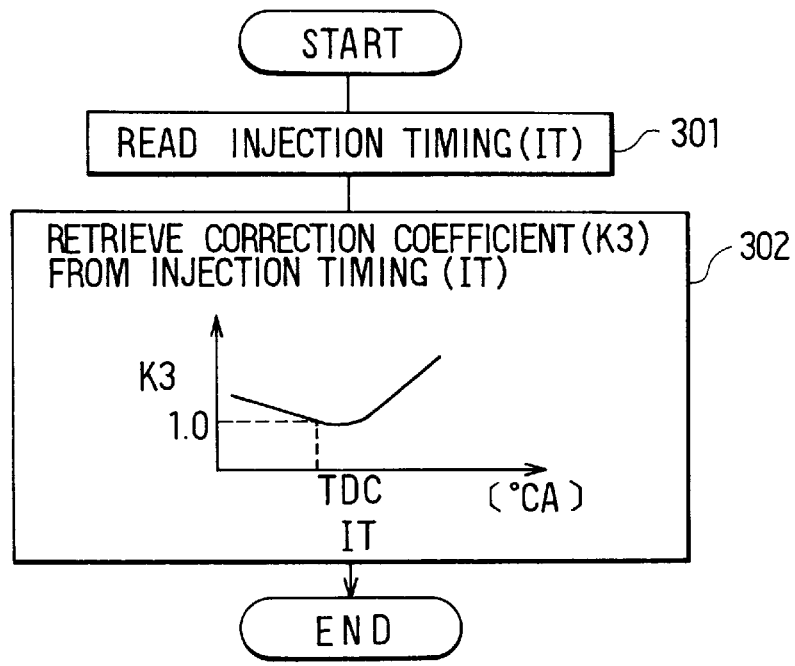
FIG. 4 is a flow chart showing a sub-routine for calculating a correction coefficient from a fuel injection timing shown in FIG. 3.

The CPU determines a correction coefficient K3 from the fuel injection timing IT in step 207 which is shown in detail in FIG. 4. In the following step 208, the CPU calculates the transient correction coefficient FAEW as a function of the basic correction coefficient FAEWBS and the correction coefficients K1 to K3: FAEW=FAEWBS·K1·K2·K3.

The correction coefficient K3 (step 207) may be determined as shown in FIG. 4 at every 180° CA. Specifically, the CPU reads in the fuel injection timing IT in step 301, and determines the correction coefficient K3 as a function of the fuel injection timing IT. This correction coefficient K3 may be retrieved from a mapped data stored in the ROM and defining a relation between K3 and IT. The correction coefficient K3 is minimum immediately after the start of the suction stroke (TDC : piston top dead center position of the suction stroke), and increases as the suction stroke proceeds or in the exhaust stroke preceding the suction stroke.

Figure 5:
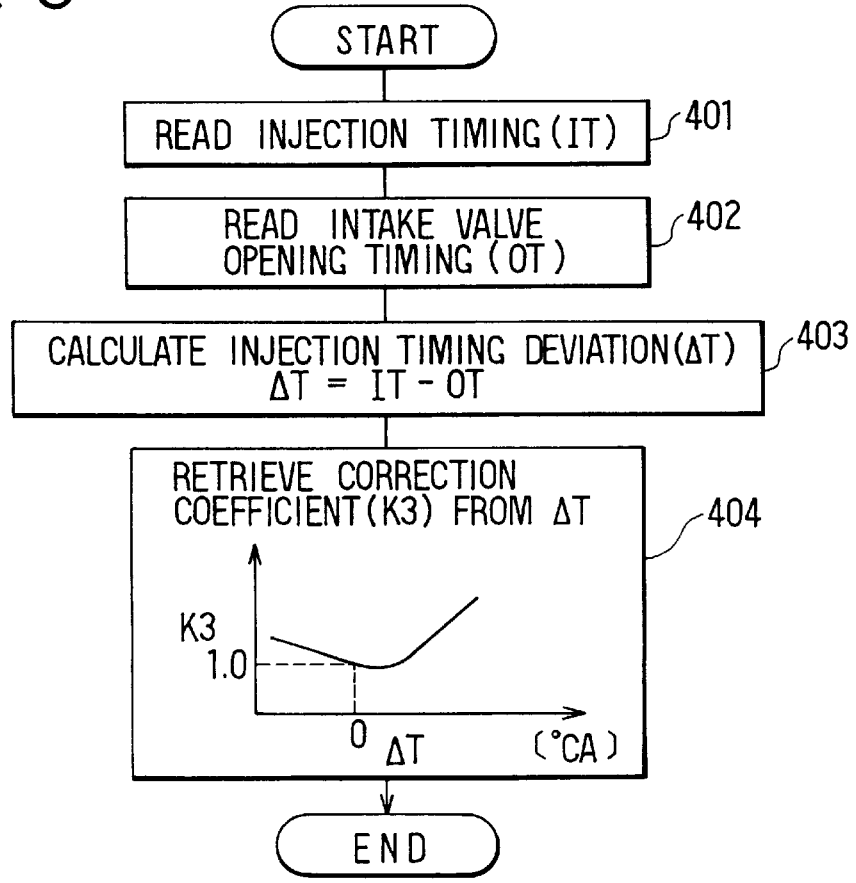
FIG. 5 is a flow chart showing a modified sub-routine for calculating the correction coefficient from the fuel injection timing shown in FIG. 3.

Alternatively, the correction coefficient K3 (step 207) may be determined as shown in FIG. 5 at every 180° CA. Specifically, the CPU reads in the fuel injection timing. IT in step 401, and reads in the valve timing of the intake valve 6 in step 402. The CPU then calculates an injection timing deviation ΔT (° CA), i.e., an angular difference between the fuel injection timing IT and an intake valve opening timing OT which is a reference of the valve timing: ΔT=IT −OT. The CPU then determines in step 403 the correction coefficient K3 from the injection timing deviation ΔT. The correction coefficient K3 may be retrieved from a mapped data stored in the ROM and defining a relation between K3 and ΔT. The correction coefficient K3 is minimum at the crankshaft rotation position where the fuel injection timing IT is slightly delayed from the opening timing OT of the intake valve 6, and increases as the injection timing deviation ΔT increases. Thus, the final fuel injection period TAU corresponding to the fuel injection timing IT can be compensated appropriately, even when the valve timing of the intake valve 6 is varied comparatively greatly by the VVT 17 during the transient operation of the engine 1.

Figure 6:
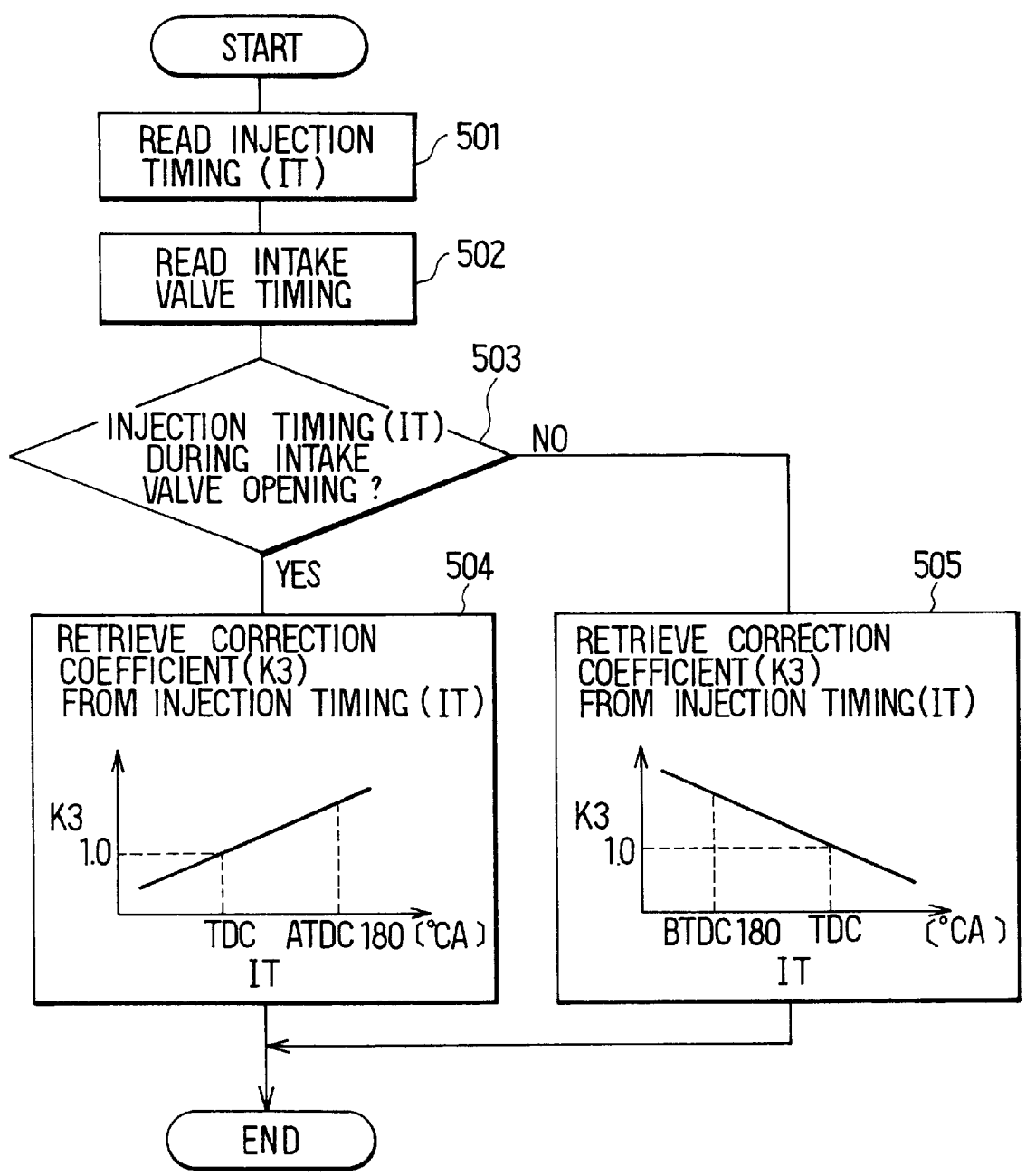
FIG. 6 is a flow chart showing another modified sub-routine for calculating the correction coefficient from the fuel injection timing shown in FIG. 3.

Still alternatively, the correction coefficient K3 (step 207) may be determined as shown in FIG. 6 at every 180° CA. Specifically, the CPU reads in the fuel injection timing IT in step 501, and reads in the valve timing of the intake valve 6 in step 502. The CPU then checks in step 503 whether the injection timing IT is within the period of opening of the intake valve 6.

If the fuel injection timing IT is within the intake valve opening period, the CPU determines in step 504 the correction coefficient K3 from the fuel injection timing IT. The correction coefficient K3 may be retrieved from a mapped data stored in the ROM and defining a relation between K3 and the injection timing IT. The correction coefficient K3 increases as the injection timing IT is delayed.

If the fuel injection timing IT is not within the intake valve opening period, on the other hand, the CPU determines in step 505 the correction coefficient K3 from the fuel injection timing IT. The correction coefficient K3 may be retrieved from a mapped data stored in the ROM and defining a relation between K3 and the injection timing IT. The correction coefficient K3 increases as the injection timing IT is advanced.

Thus, the final fuel injection period TAU corresponding to the fuel injection timing IT can be compensated appropriately, even when the valve timing of the intake valve 6 is varied comparatively greatly by the VVT 17 during the transient operation of the engine 1. As a result, the air-fuel ratio of the mixture supplied to the engine 1 can be controlled accurately, thereby improving drivability and exhaust emissions.

Figure 7:
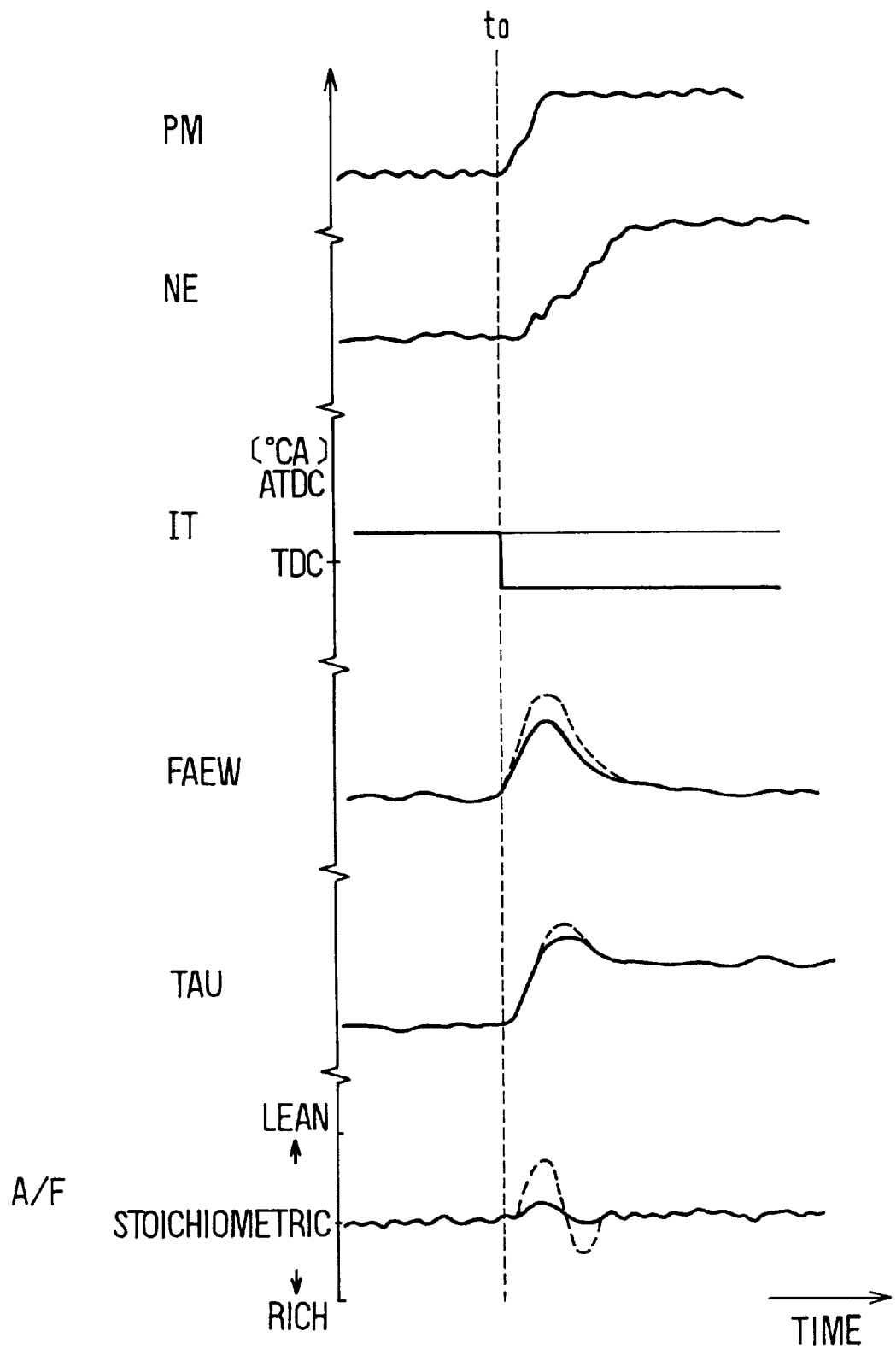
FIG. 7 is a time chart showing fuel injection control operation of the embodiment of the present invention.

Operation of the above embodiment is shown in FIG. 7, in which the solid lines and the dotted lines indicate the operation characteristics where the above injection timing responsive fuel injection control is implemented and not implemented, respectively. As shown in FIG. 7, when an engine load (intake air pressure PM) changes at timing t0, the basic transient correction coefficient FAEWBS is calculated (step 202) and the correction coefficients K1 and K2 are calculated (steps 205 and 206) based on engine parameters NE, THA, THW indicative of the engine operating condition. The fuel injection timing IT is varied to cope with the engine transient condition because the flow characteristics of the injected fuel to enter into the combustion chamber changes. The correction coefficient K3 is determined (step 207) based on the injection timing IT to compensate for this change in the flow characteristics of the injected fuel. The transient correction coefficient FAEW is optimized (step 208) by correcting the basic correction coefficient FAEWBS by the correction coefficients K1 to K3. Thus, the final fuel injection period TAU is also optimized to match the transient condition, thereby maintaining the air-fuel ratio A/F of the mixture supplied to the engine 1 at around the stoichiometric ratio even at the engine transient operating condition.

The present invention should not be limited to the disclosed embodiment and modifications, but may be implemented in many other ways without departing from the spirit of the invention. For instance, the transient correction coefficient may be calculated from changes in a throttle opening angle or from changes in an intake air flow amount in place of from changes in an intake air pressure.

What is claimed is:

1. A fuel injection control system for an engine having a fuel injector and an intake valve, said system comprising:

means for calculating, based on an engine load in an operating condition of the engine, a basic injection amount of fuel to be supplied to the engine from the fuel injector;

means for calculating, based on the operating condition of the engine, fuel injection timing of the fuel injector so that the fuel injector injects fuel in overlapping relation with an opening of the intake valve;

means for calculating, based on the operating condition of the engine, a correction coefficient to be used to correct the basic injection amount;

means for correcting, based on the fuel injection timing, the correction coefficient; and means for calculating a final injection amount of fuel by correcting the basic injection amount by the corrected correction coefficient, so that the injector injects fuel in the calculated final injection amount;

wherein the correction coefficient correcting means corrects the correction coefficient based on crankshaft rotation position corresponding to final injection timing.

2. The fuel injection control system as in claim 1 wherein the correction coefficient correcting means corrects the correction coefficient based on changes in amount of fuel supplied to an engine cylinder, the changes being caused by changes in fuel injection timing.

3. The fuel injection control system as in claim 1 wherein the correction coefficient correcting means corrects the correction coefficient to a first value when the fuel injection timing is optimum, and to a second value larger than said first value as the fuel injection timing deviates from optimum timing.

4. The fuel injection control system as in claim 1 wherein the correction coefficient correcting means corrects the correction coefficient based on opening timing of the intake valve.

5. A fuel injection control system for an engine having a fuel injector and an intake valve, said system comprising:

means for calculating, based on an engine load in an operating condition of the engine, a basic injection amount of fuel to be supplied to the engine from the fuel injector;

means for calculating, based on the operating condition of the engine, fuel injection timing of the fuel injector so that the fuel injector injects fuel in overlapping relation with an opening of the intake valve;

means for calculating, based on the operating condition of the engine, a correction coefficient to be used to correct the basic injection amount;

means for correcting, based on the fuel injection timing, the correction coefficient; and means for calculating a final injection amount of fuel by correcting the basic injection amount by the corrected correction coefficient, so that the injector injects fuel in the calculated final injection amount;

wherein the correction coefficient correcting means corrects the correction coefficient based on opening timing of the intake valve.

6. The fuel injection control system as in claim 5 wherein the correction coefficient correcting means corrects the correction coefficient based on changes in amount of fuel supplied to an engine cylinder, the changes being caused by changes in fuel injection timing.

7. The fuel injection control system as in claim 5 wherein the correction coefficient correcting means corrects the correction coefficient to a first value when the fuel injection timing is optimum, and to a second value larger than said first value as the fuel injection timing deviates from optimum timing.

8. A fuel injection control system for an engine having a fuel injector and an intake valve, said system comprising:

a fuel injection control connected and adapted to inject fuel to an intake valve only while it is open; and means for correcting a calculated amount of fuel to be injected based on engine operating conditions by correcting a correction coefficient based on crankshaft rotation position corresponding to fuel injection timing.

9. A fuel injection control system for an engine having a fuel injector and an intake valve, said system comprising:

a fuel injection control connected and adapted to inject fuel to an intake valve only while it is open; and means for correcting a calculated amount of fuel to be injected based on engine operating conditions by correcting a correction coefficient based on opening timing of the intake valve.

* * * * *